United States Patent
Tsumekawa et al.

(10) Patent No.: US 10,323,825 B2
(45) Date of Patent: Jun. 18, 2019

(54) LIGHT GUIDE, ILLUMINATION DEVICE, SENSOR UNIT, READING APPARATUS, IMAGE FORMING APPARATUS, AND PAPER SHEET DISTINGUISHING APPARATUS

(71) Applicant: CANON COMPONENTS, INC., Kodama-gun, Saitama (JP)

(72) Inventors: Yoshihiko Tsumekawa, Saitama (JP); Hidehisa Takahashi, Saitama (JP)

(73) Assignee: CANON COMPONENTS, INC., Saitama (JP)

( * ) Notice: Subject to any disclaimer, the term of this patent is extended or adjusted under 35 U.S.C. 154(b) by 0 days.

(21) Appl. No.: 15/821,107

(22) Filed: Nov. 22, 2017

(65) Prior Publication Data

US 2018/0149337 A1 May 31, 2018

(30) Foreign Application Priority Data

Nov. 30, 2016 (JP) ................. 2016-233142

(51) Int. Cl.
| | |
|---|---|
| *G06K 7/10* | (2006.01) |
| *F21V 7/00* | (2006.01) |
| *F21V 7/10* | (2006.01) |
| *G01J 1/42* | (2006.01) |
| *G01J 1/04* | (2006.01) |
| *G02B 6/00* | (2006.01) |
| *H04N 1/028* | (2006.01) |
| *G07D 7/202* | (2016.01) |
| *G03B 27/80* | (2006.01) |

(52) U.S. Cl.
CPC .............. *F21V 7/0025* (2013.01); *F21V 7/10* (2013.01); *G01J 1/0411* (2013.01); *G01J 1/42* (2013.01); *G02B 6/00* (2013.01); *H04N 1/0284* (2013.01); *G03B 27/80* (2013.01); *G07D 7/202* (2017.05)

(58) Field of Classification Search
CPC ... G06K 7/10722; G06K 7/14; G06K 7/10851
USPC .......................................... 235/454
See application file for complete search history.

(56) References Cited

U.S. PATENT DOCUMENTS

| | | | | |
|---|---|---|---|---|
| 6,172,356 B1 * | 1/2001 | Ogura | ............... | H04N 1/02835 250/227.11 |
| 9,838,560 B2 * | 12/2017 | Ohzawa | .................. | H04N 1/04 |
| 2015/0198758 A1 * | 7/2015 | Yamamura | ......... | H04N 1/02835 358/474 |
| 2016/0212293 A1 * | 7/2016 | Ohzawa | .................. | H04N 1/04 |
| 2016/0277623 A1 * | 9/2016 | Ouchi | ............... | H04N 1/02835 |

FOREIGN PATENT DOCUMENTS

JP           2001223852 A      8/2001

* cited by examiner

*Primary Examiner* — Ashik Kim
(74) *Attorney, Agent, or Firm* — Rossi, Kimms & McDowell LLP

(57) ABSTRACT

A first reflection light guide includes an axial part as an end part, and a main body part, has a linear rod-like shape including the end part and the main body part, and allows light from a first reflection light source to enter the end part and to be emitted from the main body part. The end part of the first reflection light guide is narrower than the main body part, and includes a contact surface in contact with a cap. The cap includes a light source side opening. A first reflection light source is arranged at the light source side opening. The first reflection light source faces the end part.

21 Claims, 14 Drawing Sheets

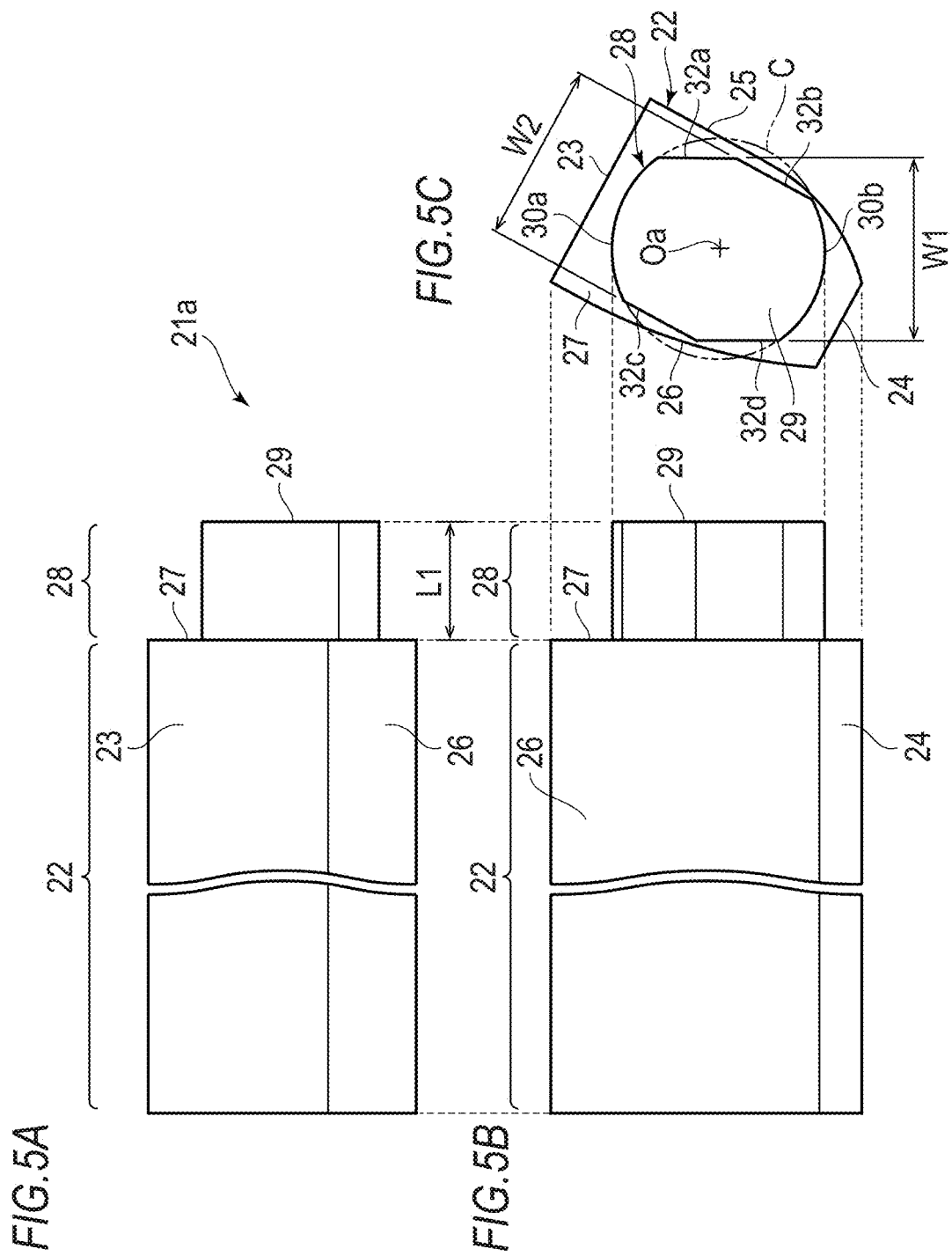

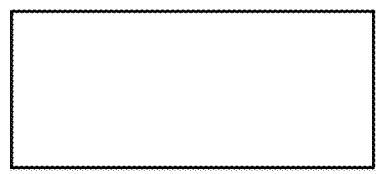
FIG.6A
FIG.6B  FIG.6C  FIG.6D
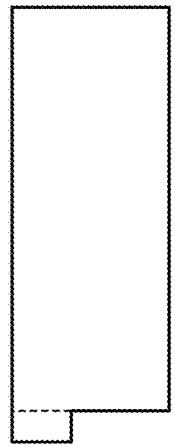 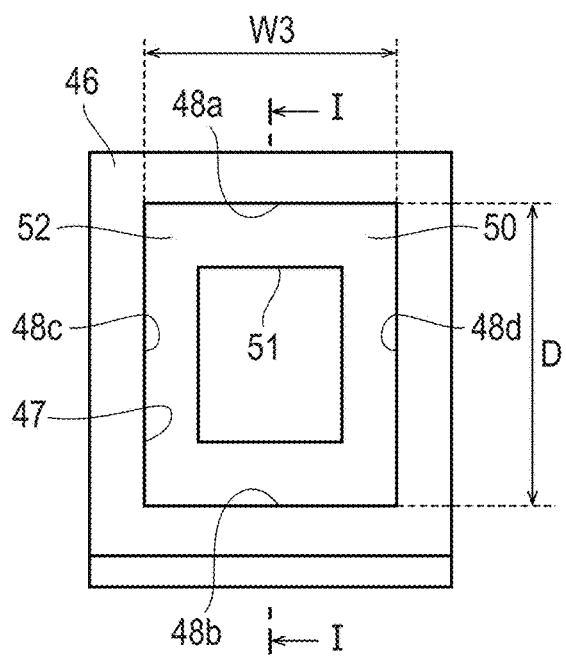 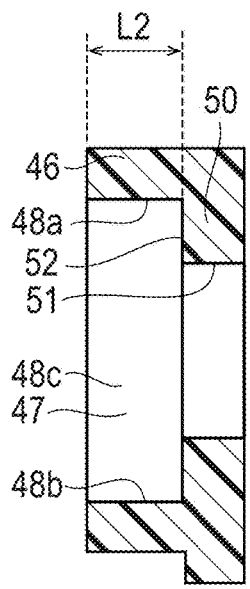

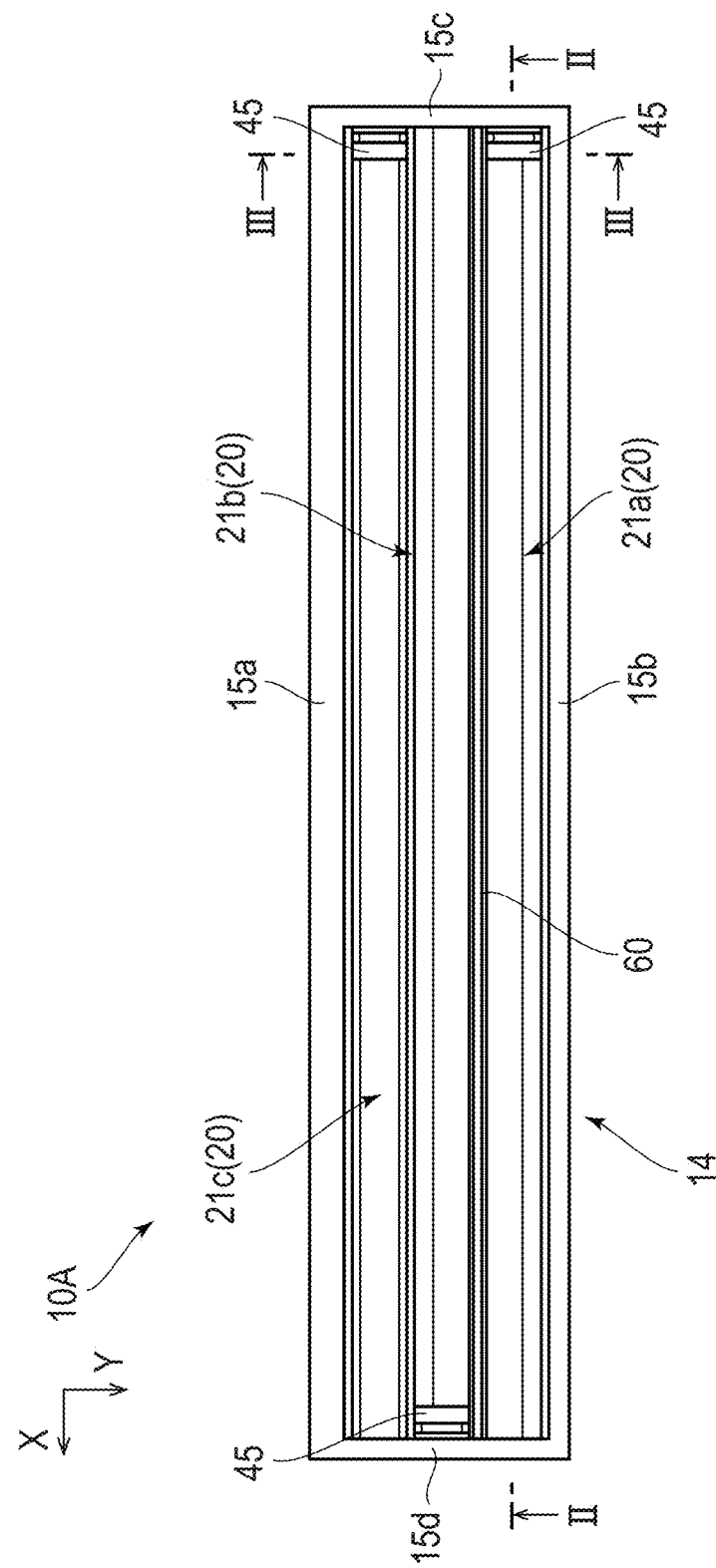

LIGHT GUIDE, ILLUMINATION DEVICE, SENSOR UNIT, READING APPARATUS, IMAGE FORMING APPARATUS, AND PAPER SHEET DISTINGUISHING APPARATUS

CROSS-REFERENCE TO RELATED APPLICATIONS

This application is based upon and claims the benefit of priority of the prior Japanese Patent Application No. 2016-233142, filed on Nov. 30, 2016, the entire contents of which are incorporated herein by reference.

BACKGROUND OF THE INVENTION

Field of the Invention

The present invention relates to a light guide, an illumination device, a sensor unit, a reading apparatus, an image forming apparatus, and a paper sheet distinguishing apparatus.

Description of the Related Art

A light guide that allows light from a light source to enter it and linearly emits the light has been known. Patent Document 1 discloses a reading apparatus in which a transparent member is provided with a protrusion, and the protrusion is fitted into an LED light source to thereby improve the positioning accuracy of attaching the LED light source.

The reading apparatus of Patent Document 1, however, has a problem in that the transparent member is not positioned in the longitudinal direction.

Patent Document 1 Japanese Laid-open Patent Publication No. 2001-223852

SUMMARY OF THE INVENTION

A light guide according to the present invention includes an end part and a main body part, has a linear rod-like shape including the end part and the main body part, and allows light from a light source to enter the end part and to be emitted from the main body part. The end part is narrower than the main body part, and includes a contact surface that is in contact with a positioning member. The positioning member has an opening. The light source is disposed at the opening. The light source faces the end part.

BRIEF DESCRIPTION OF THE DRAWINGS

FIG. 5A is a diagram showing the configuration of a first reflection light guide;

FIG. 5B is a diagram showing the configuration of the first reflection light guide;

FIG. 5C is a diagram showing the configuration of the first reflection light guide;

FIG. 6A is a diagram showing the configuration of a cap;

FIG. 6B is a diagram showing the configuration of the cap;

FIG. 6C is a diagram showing the configuration of the cap;

FIG. 6D is a diagram showing the configuration of the cap;

FIG. 7 is a plan view of the lower image sensor unit;

DETAILED DESCRIPTION OF THE PREFERRED EMBODIMENTS

Hereinafter, referring to the diagrams, preferable embodiments of a light guide, an illumination device, an image sensor unit (sensor unit), and an image reading apparatus (reading apparatus) according to the present invention are described. In the following description, three-dimensional directions are indicated by the respective X, Y and Z arrows. The X-direction is the longitudinal direction of the light guide described later and, for example, a main-scan direction. The Y-direction is a sub-scan direction perpendicular to the main-scan direction. The Z-direction is a perpendicular direction (vertical direction).

(First Embodiment)

An image reading apparatus 100 according to this embodiment functions as a paper sheet discriminating apparatus that authenticates a paper sheet, such as a bill, security and so on.

Figure 1:
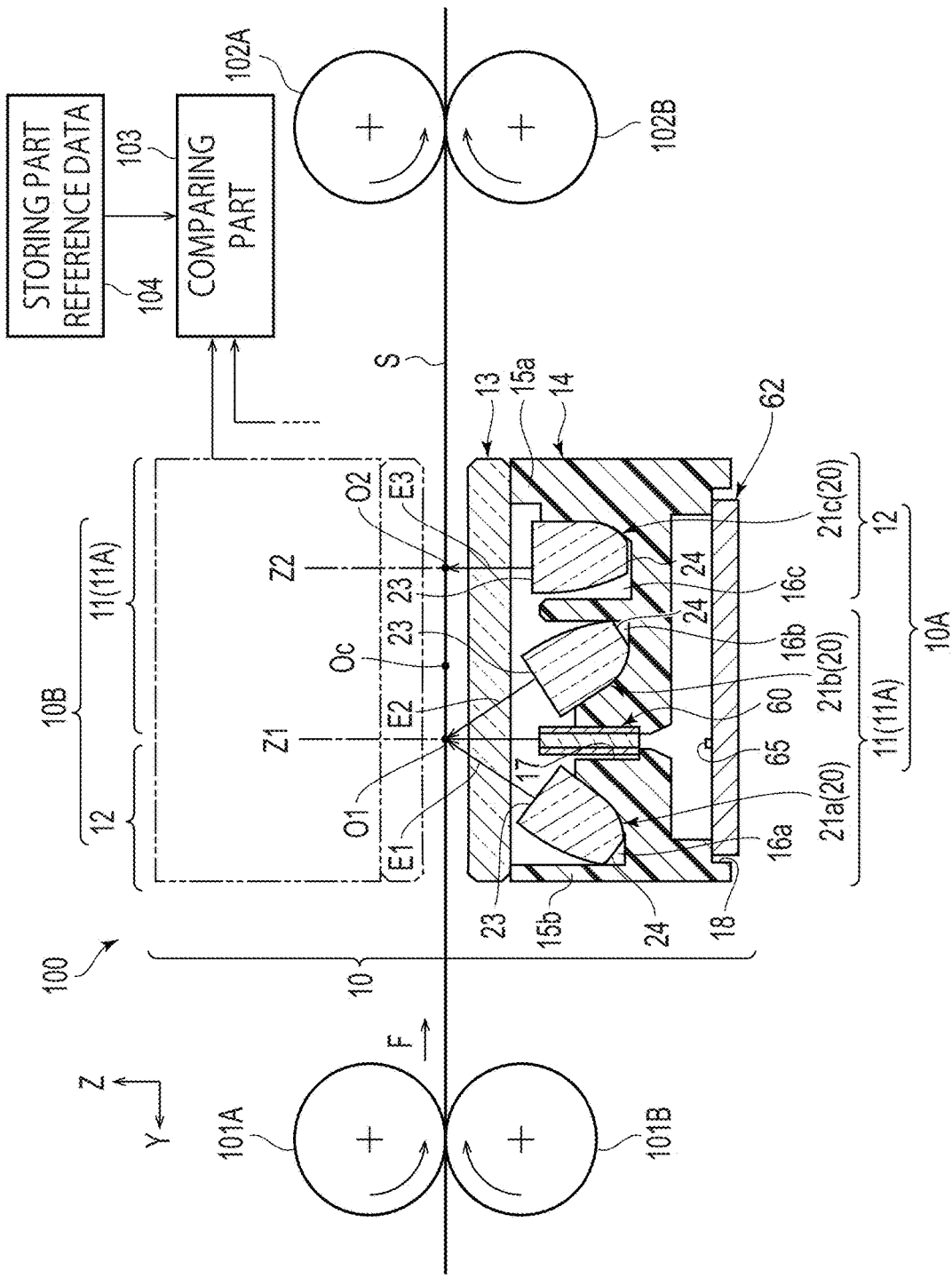
FIG. 1 is a sectional diagram showing an essential part configuration of an image reading apparatus of a first embodiment.

FIG. 1 is a sectional view showing essential parts of the image reading apparatus 100 provided with an image sensor unit part 10 according to this embodiment. First, the entire configuration will be schematically described. In this embodiment, a bill S will be described as a typical example of an object to be illuminated. However, the present invention can also be applied to other objects than the bill S.

In the image reading apparatus 100, a pair of conveyor rollers 101A and 101B and a pair of conveyor rollers 102A and 102B that serve as conveyance parts for conveying the bill S held therebetween are disposed at predetermined positions at a predetermined interval in a conveyance direction F of the bill S. The conveyor rollers 101A, 101B, 102A and 102B are designed to be rotated and driven by a driving mechanism to relatively convey the bill S to the image sensor unit part 10 at a predetermined conveyance speed in the conveyance direction F.

The image sensor unit part 10 is disposed to have a gap so as to constitute a conveyance path that resides between the conveyor rollers 101A and 101B and the conveyor rollers 102A and 102B and allows the bill S to pass therethrough, and reads an image of the bill S being conveyed. The image sensor unit part 10 has a lower image sensor unit 10A that serves as a first image sensor unit located below the conveyance path for the bill S and an upper image sensor unit 10B that serves as a second image sensor unit located above the conveyance path for the bill S, with the conveyance path intervening between these units. In this embodiment, the lower image sensor unit 10A and the upper image sensor unit 10B have the same configuration and disposed symmetrically with respect to a center line Oc shown in FIG.

1. Each of the lower image sensor unit 10A and the upper image sensor unit 10B includes an image reading part 11 for reading an image that includes a reflection light illumination part 11A that emits light for reflection reading (light for reflection) to the bill S and a transmission illumination part 12 that emits light for transmission reading (light for transmission) to the bill S. The image reading part 11 (reflection light illumination part 11A) and the transmission illumination part 12 allow image information through light reflected from the bill S to be read and allow image information through transmission light to be read. The transmission illumination part 12 of the upper image sensor unit 10B is disposed opposite to the image reading part 11 of the lower image sensor unit 10A. The image reading part 11 of the upper image sensor unit 10B is disposed opposite to the transmission illumination part 12 of the lower image sensor unit 10A. Consequently, in this embodiment, the lower image sensor unit 10A and the upper image sensor unit 10B can read both sides of the bill S in one conveyance.

A comparing part 103 acquires image information read by the lower image sensor unit 10A and the upper image sensor unit 10B. Further, the comparing part 103 reads reference data stored in a storing part 104, compares the data with the acquired image information, and authenticates the bill S. An image of an authentic bill is preliminarily stored in the storing part 104.

Next, the configurations of the lower image sensor unit 10A and the upper image sensor unit 10B are described. The lower image sensor unit 10A and the upper image sensor unit 10B have the same configuration. Accordingly, the lower image sensor unit 10A is exemplified and described.

Figure 2:
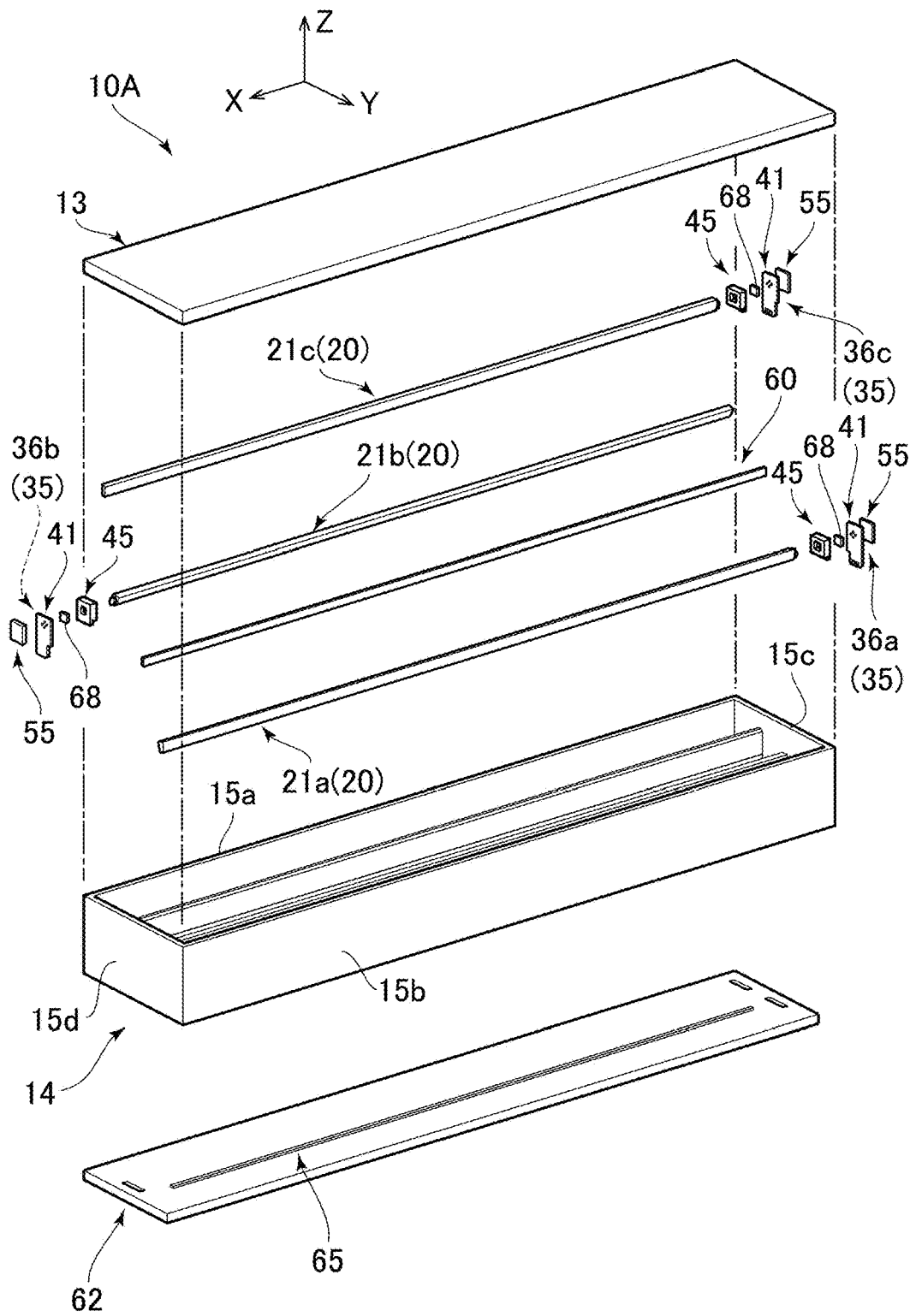
FIG. 2 is a schematic exploded perspective view of a lower image sensor unit.
Figure 3:
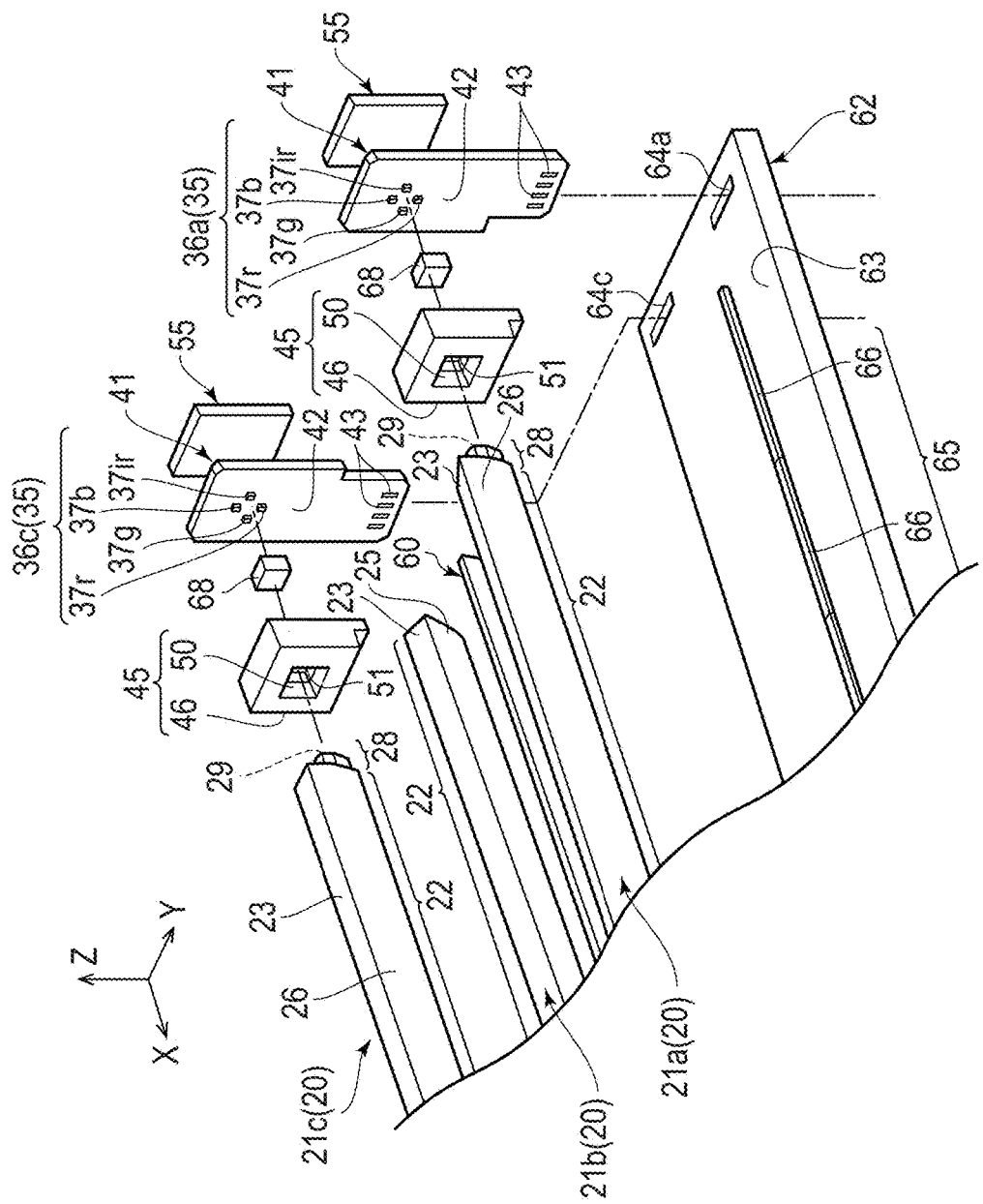
FIG. 3 is an enlarged view of the lower image sensor unit.
Figure 4:
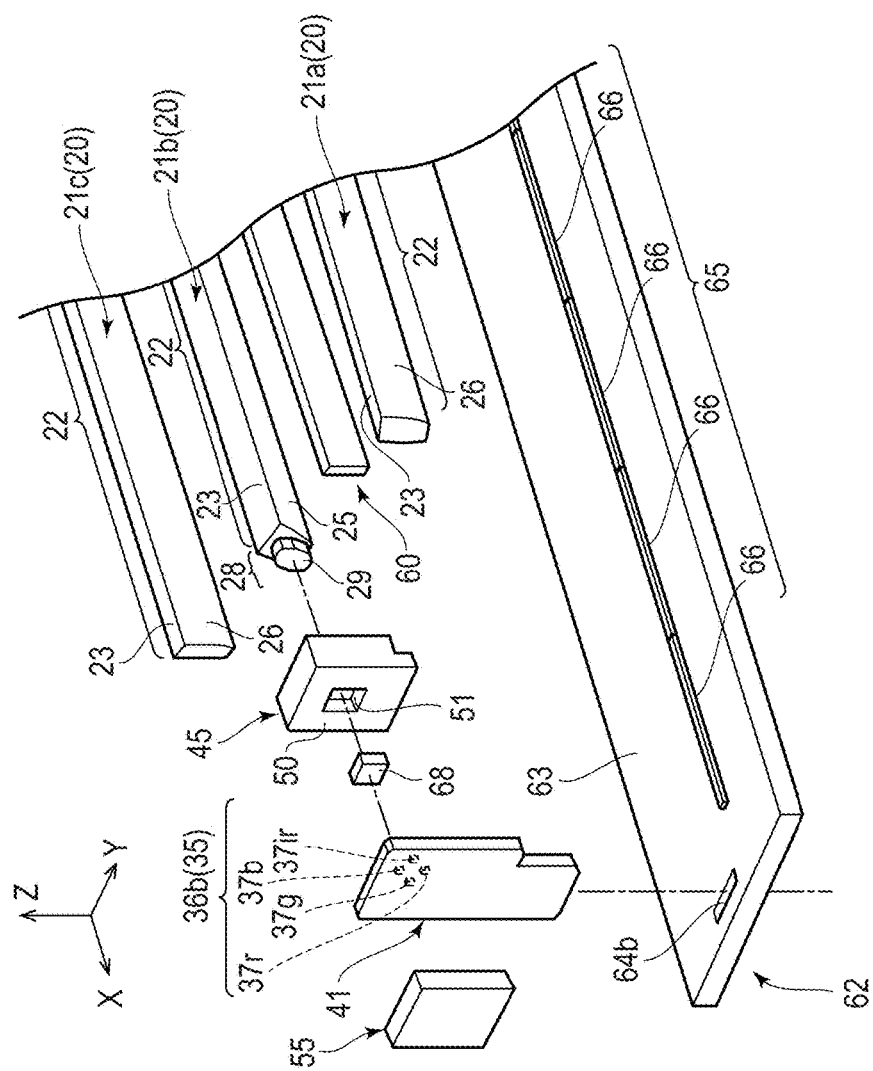
FIG. 4 is an enlarged view of the lower image sensor unit.

FIG. 2 is a schematic exploded perspective view of the lower image sensor unit 10A. FIG. 3 is a perspective view where one side of the lower image sensor unit 10A in the longitudinal direction is enlarged. FIG. 4 is a perspective view where the other side of the lower image sensor unit 10A in the longitudinal direction is enlarged.

The lower image sensor unit 10A includes a cover member 13, a frame 14, light guide parts 20, light source parts 35, caps 45, a light collector 60, a sensor substrate 62, and an image sensor (a sensor or a line sensor) 65. The light guide part 20, the light source parts 35, and the caps 45 among the configuration members function as an illumination device. The cover member 13, the frame 14, the light guide part 20, the sensor substrate 62, and the image sensor 65 are formed to have a length in conformity with the dimension of the bill S to be read in the main-scan direction.

The cover member 13 prevents dust from entering the inside of the frame 14. The cover member 13 has a planar shape with the longitudinal direction being aligned with the main-scan direction. The cover member 13 is fixed to the frame 14 with double-faced tape so as to cover the frame 14 from the upper side. For example, glass is applicable as the cover member 13. Note that the cover member 13 is not limited to what is made of glass. This member may be a transparent resin material, for example, acrylic, polycarbonate or the like.

The frame 14 houses the configuration elements of the lower image sensor unit 10A. The frame 14 has a substantially rectangular parallelepiped with the longitudinal direction being aligned with the main-scan direction, and includes side walls 15a to 15d. As shown in FIG. 1, light guide housing parts 16a, 16b and 16c that house the light guide parts 20 are formed along the longitudinal direction of the frame 14, at the center and the opposite ends of the frame 14. A light collector housing part 17 that houses the light collector 60 is formed along the longitudinal direction of the frame 14, nearer to the center of the frame 14 between a light guide housing part 16a and a light guide housing part 16b. A substrate housing part 18 for allowing the sensor substrate 62 to be disposed therein is formed along the longitudinal direction of the frame 14 below the frame 14. For example, polycarbonate is applicable as the frame 14.

The light guide part 20 allows light from the light source parts 35 to enter it and emits linear light to the bill S. The light guide part 20 of this embodiment includes a first reflection light guide 21a, a second reflection light guide 21b, and a transmission light guide 21c. The first reflection light guide 21a and the second reflection light guide 21b constitute a part of the reflection light illumination part (reflection light illumination device) 11A. The transmission light guide 21c constitutes a part of the transmission illumination part (transmission illumination device) 12.

In this embodiment, the first reflection light guide 21a, the second reflection light guide 21b, and the transmission light guide 21c have the same configuration. The first reflection light guide 21a is described below.

The first reflection light guide 21a has a substantially rod-shape with the longitudinal direction being aligned with the main-scan direction. For example, an acrylic transparent resin material is applicable as the first reflection light guide 21a.

FIGS. 5A to 5C are diagrams showing the configuration of the first reflection light guide 21a. More specifically, FIG. 5A is the top view of the first reflection light guide 21a. FIG. 5B is the diagram in view in the sub-scan direction. FIG. 5C is the diagram in view in the main-scan direction.

The first reflection light guide 21a includes a main body part 22, and an axial part 28. The first reflection light guide 21a has a linear rod-like shape including the main body part 22 and the axial part 28. In the first reflection light guide 21a, light from a first reflection light source 36a enters the axial part 28 and is emitted from the main body part 22 toward the bill S.

The main body part 22 has a substantially rod-like shape, and has the same or substantially the same sectional shape from one end to the other end in the longitudinal direction. The main body part 22 includes a light emission surface 23, a diffusion surface 24, a first reflection surface 25, and a second reflection surface 26. The light emission surface 23 is a surface that faces the bill S. The light emission surface 23 emits the light having entered the main body part 22, to the bill S. In this embodiment, the light emission surface 23 has a planar shape. Alternatively, this surface may have a curved shape, such as a convex or concave shape. The diffusion surface 24 is a surface opposite to the light emission surface 23. The diffusion surface 24 diffuses the light having entered the main body part 22 toward the light emission surface 23, and reflects the light in the longitudinal direction of the main body part 22. A pattern shape may be formed on the diffusion surface 24 by silk screen printing or the like to diffuse the light. A prism may be formed thereon. In this embodiment, the diffusion surface 24 has a planar shape. Alternatively, this surface may have a curved shape, such as a convex or concave shape.

The first reflection surface 25 is one surface of the first reflection light guide 21a in the width direction (sub-scan direction); the surface connects the light emission surface 23 and the diffusion surface 24 to each other. The second reflection surface 26 is the other surface of the first reflection light guide 21a in the width direction; the surface connects the light emission surface 23 and the diffusion surface 24 to each other. The first reflection surface 25 and the second reflection surface 26 reflect the light having entered the main body part 22, in the longitudinal direction of the main body part 22. In this embodiment, the first reflection surface 25 and the second reflection surface 26 have convex curved shape. Alternatively, each of the surfaces may be a curved surface in which multiple planes are continuously connected, or a planar or concave curved surface.

The axial part 28 is positioned at one end of the main body part 22 in the longitudinal direction, and is configured as an end part. More specifically, the axial part 28 protrudes from a substantial center position on one end surface 27 of the main body part 22. The axial part 28 has a rod-like shape along the longitudinal direction of the main body part 22, and has the same or substantially the same sectional shape from one end to the other end in the axial direction. The length of the axial part 28 in the axial direction is L1. The axial part 28 has a sectional shape that is smaller than the sectional shape of the main body part 22, and is thus narrower than the main body part 22.

An end surface 29 that is one end of the axial part 28 functions as a contact surface and an incident surface. The contact surface is in contact with the cap 45 disposed on the light source part 35 side, thereby regulating the interval between the light source part 35 and the first reflection light guide 21a to have a predetermined distance. The incident surface allows the light from the light source part 35 to enter the axial part 28 and the main body part 22.

As shown in FIG. 5C, the axial part 28 is oriented in the axial direction and includes a surface that intersects with the end surface 29 and a first curved surface 30a, a second curved surface 30b, a first side surface 32a, a second side surface 32b, a third side surface 32c, and a fourth side surface 32d.

The first curved surface 30a and the second curved surface 30b have convex curved shapes. The first curved surface 30a and the second curved surface 30b are in proximity to or in contact with the cap 45, thereby positioning the vertical direction of the first reflection light guide 21a.

More specifically, the first curved surface 30a is formed on a part of the outer peripheral surface of the axial part 28 nearer to the light emission surface 23. The second curved surface 30b is formed on a part of the outer peripheral surface of the axial part 28 nearer to the diffusion surface 24. That is, the first curved surface 30a and the second curved surface 30b are disposed opposite to each other. As shown in FIG. 5C, in view of the axial part 28 in the axial direction, the first curved surface 30a and the second curved surface 30b constitute a part of a common virtual circle C. Here, the axis in the axial direction passing through the center of the virtual circle C is indicated by reference symbol Oa.

The first side surface 32a, the second side surface 32b, the third side surface 32c, and the fourth side surface 32d are disposed between the first curved surface 30a and the second curved surface 30b. The first side surface 32a to the fourth side surface 32d have planar shapes. The first side surface 32a to the fourth side surface 32d are in proximity to or in contact with the cap 45, thereby positioning the width direction of the first reflection light guide 21a.

The first side surface 32a and the second side surface 32b are formed on a part of the outer peripheral surface of the axial part 28 nearer to the first reflection surface 25. More specifically, the first side surface 32a is disposed between the first curved surface 30a and the second side surface 32b. The second side surface 32b is disposed between the second curved surface 30b and the first side surface 32a.

The third side surface 32c and the fourth side surface 32d are formed on a part of the outer peripheral surface of the axial part 28 nearer to the second reflection surface 26. More specifically, the third side surface 32c is disposed between the first curved surface 30a and the fourth side surface 32d. The fourth side surface 32d is disposed between the second curved surface 30b and the third side surface 32c.

As shown in FIG. 5C, in view of the axial part 28 in the axial direction, the side of the first side surface 32a and the side of the fourth side surface 32d are in parallel with each other. In this embodiment, the side of the first side surface 32a and the side of the fourth side surface 32d are positioned point-symmetrically with respect to the axis Oa. The side of the second side surface 32b and the side of the third side surface 32c are in parallel to each other. In this embodiment, the side of the second side surface 32b and the side of the third side surface 32c are positioned point-symmetrically with respect to the axis Oa. As described above, the axial part 28 includes multiple combinations (two pairs) of parallel sides.

The axial part 28 in this embodiment is not necessarily the side, and the side surface itself is parallel. More specifically, the first side surface 32a and the fourth side surface 32d are in parallel to each other. The second side surface 32b and the third side surface 32c are in parallel to each other. As described above, the axial part 28 includes multiple combinations (two pairs) of side surfaces that are parallel to each other.

The first reflection light guide 21a has thus been described. Likewise, the second reflection light guide 21b and the transmission light guide 21c have the same configuration. The second reflection light guide 21b has a configuration in which the configuration of the first reflection light guide 21a is reversed in the longitudinal direction. Consequently, as shown in FIG. 4, this light guide includes the axial part 28 at the other end of the main body part 22 in the longitudinal direction.

The light source part 35 emits light to thereby emit the light through the light guide part 20 to the bill S. The light source part 35 of this embodiment includes the first reflection light source 36a, a second reflection light source 36b, and a transmission light source 36c. The first reflection light source 36a and the second reflection light source 36b constitute a part of the reflection light illumination part 11A. The transmission light source 36c constitutes a part of the transmission illumination part 12.

In this embodiment, the first reflection light source 36a, the second reflection light source 36b, and the transmission light source 36c have the same configuration. The first reflection light source 36a is described below.

The first reflection light source 36a is disposed at a side of the first reflection light guide 21a nearer to the axial part 28. The first reflection light source 36a of this embodiment includes multiple (four in this case) LED chips 37r, 37g, 37b and 37ir serving as light emitting elements. The LED chips 37r, 37g and 37b respectively emit red, green and blue (hereinafter also called RGB) wavelength lights, which are visible light. The LED chip 37ir emits infrared (hereinafter also called IR) wavelength light. The invisible light having a wavelength, such as of infrared light, is emitted for reading an image of the bill S printed with invisible ink. Alternatively, the first reflection light source 36a may include an LED chip that emits light having a wavelength of ultraviolet light.

The first reflection light source 36a is mounted on a planar circuit substrate 41. The circuit substrate 41 includes a mounting surface 42, and multiple (five in this case) external connection pads 43. The circuit substrate 41 is disposed nearer to the axial part 28 of the first reflection light guide 21a so that the mounting surface 42 can be orthogonal to the axial direction of the axial part 28. The mounting surface 42 is mounted with the first reflection light source 36a. The external connection pad 43 is electrically connected to the first reflection light source 36a via a circuit pattern on the substrate.

The circuit substrate 41 is provided with the cap 45. The cap 45 is fixed onto the mounting surface 42 of the circuit substrate 41 with adhesive or an engagement part. The cap 45 is substantially box-shaped. For example, a resin material prone to reflecting light or a material preventing light emitted by the first reflection light source 36a from being transmitted is applicable as the material of the cap 45. The cap 45 holds the axial part 28 of the first reflection light guide 21a so as to cover this part, thereby serving as a positioning member that positions the first reflection light guide 21a with respect to the first reflection light source 36a.

FIGS. 6A to 6D are diagrams showing the configuration of the cap 45. More specifically, FIG. 6A is the top view of the cap 45. FIG. 6B is the diagram in view in the sub-scan direction. FIG. 6C is the diagram in view in the main-scan direction. FIG. 6D is the sectional view taken along line I-I.

The cap 45 includes a positioning part 46, and a contact target part 50.

The positioning part 46 holds the axial part 28. The positioning part 46 has a rectangular cylinder shape. The contact target part 50 is integrally formed at one end. A light guide side opening 47 is included on the other end. The positioning part 46 has the same or substantially the same sectional shape along the opening direction. The positioning part 46 allows the axial part 28 of the first reflection light guide 21a to be inserted from the light guide side opening 47. Here, the length of the positioning part 46 in the opening direction is L2. The relationship between the length L1 of the axial part 28 and the length L2 of the positioning part 46 is L1>L2.

The positioning part 46 includes a first inner surface 48a, a second inner surface 48b, a third inner surface 48c and a fourth inner surface 48d, on the inner peripheral surface. The first inner surface 48a to the fourth inner surface 48d have planar shapes. As shown in FIG. 6C, in view of the cap 45 in the axial direction, the side of the first inner surface 48a and the side of the second inner surface 48b are in parallel with each other. The side of the third inner surface 48c and the side of the fourth inner surface 48d are in parallel to each other.

In this embodiment, the first inner surface 48a and the second inner surface 48b are disposed on the upper and lower areas of the inner peripheral surface, face each other and are parallel to each other. Here, a distance D between the first inner surface 48a and the second inner surface 48b is substantially identical to the diameter of the virtual circle C common to the first curved surface 30a and the second curved surface 30b of the axial part 28. Consequently, in a case where the axial part 28 of the first reflection light guide 21a is inserted into the positioning part 46, the first curved surface 30a of the axial part 28 is in proximity to or in contact with the first inner surface 48a, and the second curved surface 30b of the axial part 28 is in proximity to or in contact with the second inner surface 48b. That is, the first inner surface 48a and the second inner surface 48b define the position of the first reflection light guide 21a in the vertical direction with respect to the first reflection light source 36a. That is, the first inner surface 48a and the second inner surface 48b function as positioning surfaces.

On the other hand, the third inner surface 48c and the fourth inner surface 48d are disposed on the inner peripheral surface in the width direction, face each other and are parallel to each other. Here, a distance W3 between the third inner surface 48c and the fourth inner surface 48d is substantially identical to a distance W1 between the first side surface 32a and the fourth side surface 32d of the axial part 28, and to a distance W2 between the second side surface 32b and the third side surface 32c of the axial part 28. Consequently, in a case where the axial part 28 of the first reflection light guide 21a is inserted into the positioning part 46, the first side surface 32a or the second side surface 32b of the axial part 28 is in proximity to or in contact with the third inner surface 48c, and the third side surface 32c or the fourth side surface 32d of the axial part 28 is in proximity to or in contact with the fourth inner surface 48d. That is, the third inner surface 48c and the fourth inner surface 48d define the position of the first reflection light guide 21a in the width direction with respect to the first reflection light source 36a. That is, the third inner surface 48c and the fourth inner surface 48d function as positioning surfaces.

A part of the end surface 29 of the axial part 28 is in contact with the contact target part 50. The contact target part 50 has a planar shape, and is formed integrally with the positioning part 46 so as to block the positioning part 46 from one end side. The contact target part 50 has a light source side opening 51 at the center; this opening is a hole for allowing light from the light source part 35 to pass therethrough. The light source side opening 51 has a rectangular shape, and has a sectional shape smaller than the light guide side opening 47 of the positioning part 46. As shown in FIG. 6C, in view from the positioning part 46, the contact target part 50 includes a contact target surface 52 around the light source side opening 51. The contact target surface 52 has a planar shape orthogonal to the direction of the opening of the positioning part 46. Here, the length L1 of the axial part 28 and the length L2 of the positioning part 46 has a relationship of L1>L2. Accordingly, in a case where the axial part 28 of the first reflection light guide 21a is inserted into the positioning part 46, the contact target surface 52 and the end surface 29 of the axial part 28 are in contact with each other on these surfaces. That is, the contact target surface 52 of the positioning part 46 defines the position of the first reflection light guide 21a in the longitudinal direction (X-axis direction) with respect to the first reflection light source 36a. As described above, the contact target surface 52 functions as the positioning surface. In a case where the axial part 28 of the first reflection light guide 21a is inserted into the positioning part 46, the end surface 27 of the main body part 20 is not contact with the positioning part 46.

The circuit substrate 41 includes a cushion member 55 as an urging member. The cushion member 55 is fixed to the surface of the circuit substrate 41 opposite to the mounting surface 42 with adhesive or the like. The cushion member 55 is in contact with the side wall 15c of the frame 14. For example, a resin material, such as polyurethane, is applicable as the cushion member 55.

The first reflection light source 36a has thus been described. Likewise, the second reflection light source 36b and the transmission light source 36c have the same configuration. The caps 45 and the cushion members 55 are fixed to the second reflection light source 36b and the transmission light source 36c. As shown in FIG. 4, the second reflection light source 36b is disposed nearer to the axial part 28 of the second reflection light guide 21b.

The light collector 60 focuses the reflection light from the bill S and the transmission light through the bill S, on the image sensor 65. For example, a rod lens array that includes a plurality of imaging elements (rod lenses) of an erect equal magnification imaging type linearly arranged in the main-scan direction can be applied as the light collector 60. The light collector 60 is not limited to have the above-described configuration if only the light collector 60 can perform focusing on the image sensor 65. Any of conventionally known optical members having various light collecting functions, such as various microlens arrays, is applicable as the light collector 60.

The sensor substrate 62 is formed to have a planar shape elongated in the main-scan direction. The mounting surface 63 of the sensor substrate 62 is orthogonal to the vertical direction. A drive circuit and the like that causes the light source part 35 to emit light and drives the image sensor 65 is mounted on the mounting surface 63 of the sensor substrate 62. At one end part of the sensor substrate 62 in the longitudinal direction, a connection part 64a and a connection part 64c are formed. At the other end part, a connection part 64b is formed. The connection parts 64a, 64b and 64c are slit-shaped hole elongated in the sub-scan direction. The circuit substrates 41 of the first reflection light source 36a, the second reflection light source 36b, and the transmission light source 36c are inserted into the respective connection parts 64a, 64b and 64c.

The image sensor 65 is mounted on the sensor substrate 62, and is disposed below the light collector 60. In the image sensor 65, which is a line sensor, a predetermined number of image sensor ICs 66 that include multiple photoelectric conversion elements according to the reading resolution of the lower image sensor unit 10A are mounted to be arranged on the mounting surface 63 linearly in the main-scan direction. The image sensor 65 receives the light acquired by focusing the reflection light and transmission light from the bill S by the light collector 60, and converts the light into an electric signal. The image sensor 65 may be anything that can convert the reflection light and the transmission light from the bill S into the electric signal, and is not limited to have the above-described configuration. Any of various image sensor ICs having been conventionally known can be applied as the image sensor IC 66.

Next, an assembly method of the image sensor unit part 10 having the configuration as described above is described. The lower image sensor unit 10A and the upper image sensor unit 10B have the same configuration. The lower image sensor unit 10A is described.

First, the configuration elements of the lower image sensor unit 10A are prepared.

Here, as shown in FIGS. 3 and 4, the first reflection light source 36a, the second reflection light source 36b and the transmission light source 36c are preliminarily mounted on the mounting surface 42 of each circuit substrate 41. Next, a coating resin 68 is applied onto the mounting surfaces 42 so as to cover the first reflection light source 36a, the second reflection light source 36b and the transmission light source 36c. Next, the cap 45 is fixed at a predetermined position on each mounting surface 42 using adhesive or an engagement part. In this case, the coating resin 68, and the first reflection light source 36a, the second reflection light source 36b or the transmission light source 36c are positioned with respect to each other, in the light source side opening 51 of each cap 45. Furthermore, the cushion member 55 is fixed onto the surface of each circuit substrate 41 opposite to the mounting surface 42, using adhesive.

Next, the axial parts 28 of the first reflection light guide 21a, the second reflection light guide 21b and the transmission light guide 21c are inserted into the positioning parts 46 of the respective caps 45. In this case, as for the first reflection light guide 21a and the second reflection light guide 21b, the axial part 28 is inserted so that the first side surface 32a and the fourth side surface 32d of this part can correspond to the respective third inner surface 48c and the fourth inner surface 48d of the positioning part 46. On the other hand, as for the transmission light guide 21c, the axial part 28 is inserted so that the second side surface 32b and the third side surface 32c of this part can correspond to the respective third inner surface 48c and the fourth inner surface 48d of the positioning part 46.

Next, the light collector 60 is housed in the light collector housing part 17 of the frame 14.

Subsequently, the first reflection light guide 21a, the second reflection light guide 21b and the transmission light guide 21c are housed in the respective light guide housing parts 16a, 16b and 16c of the frame 14, and each circuit substrate 41 is housed in the frame 14.

Next, the cover member 13 is fixed onto the upper surface of the frame 14 so as to cover the frame 14 from its upper side, and the sensor substrate 62 is housed in the substrate housing part 18. In this case, the circuit substrates 41 of the first reflection light source 36a and the transmission light source 36c, which protrude from the frame 14, are respectively inserted into the connection part 64a and the connection part 64c at one end of the sensor substrate 62 in the longitudinal direction. On the other hand, the circuit substrate 41 of the second reflection light source 36b, which protrudes from the frame 14, is inserted into the connection part 64b of the sensor substrate 62 in the longitudinal direction.

Next, the external connection pads 43 of the circuit substrates 41, which are exposed from the connection parts 64a, 64b and 64c of the sensor substrate 62, are soldered onto the sensor substrate 62. Lastly, the sensor substrate 62 housed in the substrate housing part 18 is fixed in the substrate housing part 18, thereby completing the lower image sensor unit 10A.

FIG. 7 is a plan view of the manufactured lower image sensor unit 10A. As shown in FIG. 7, the lower image sensor unit 10A has a generally rectangular shape, the longitudinal direction being aligned with the main-scan direction, and the sub-scan direction perpendicular to the main-scan direction being aligned with the conveyance direction F for the bill S.

Next, positioning of the first reflection light guide 21a in the longitudinal direction is described.

Figure 8:
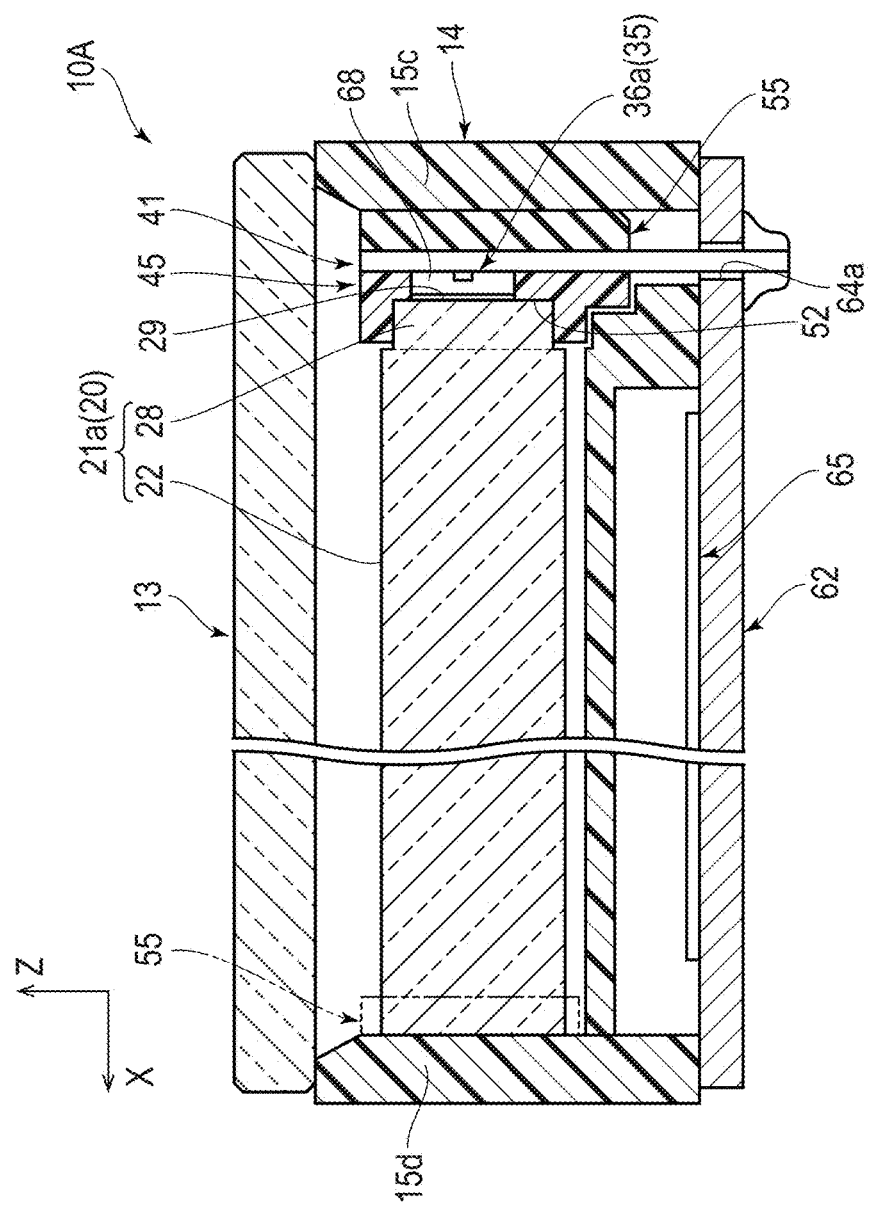
FIG. 8 is a sectional view of the lower image sensor unit.
Figure 9:
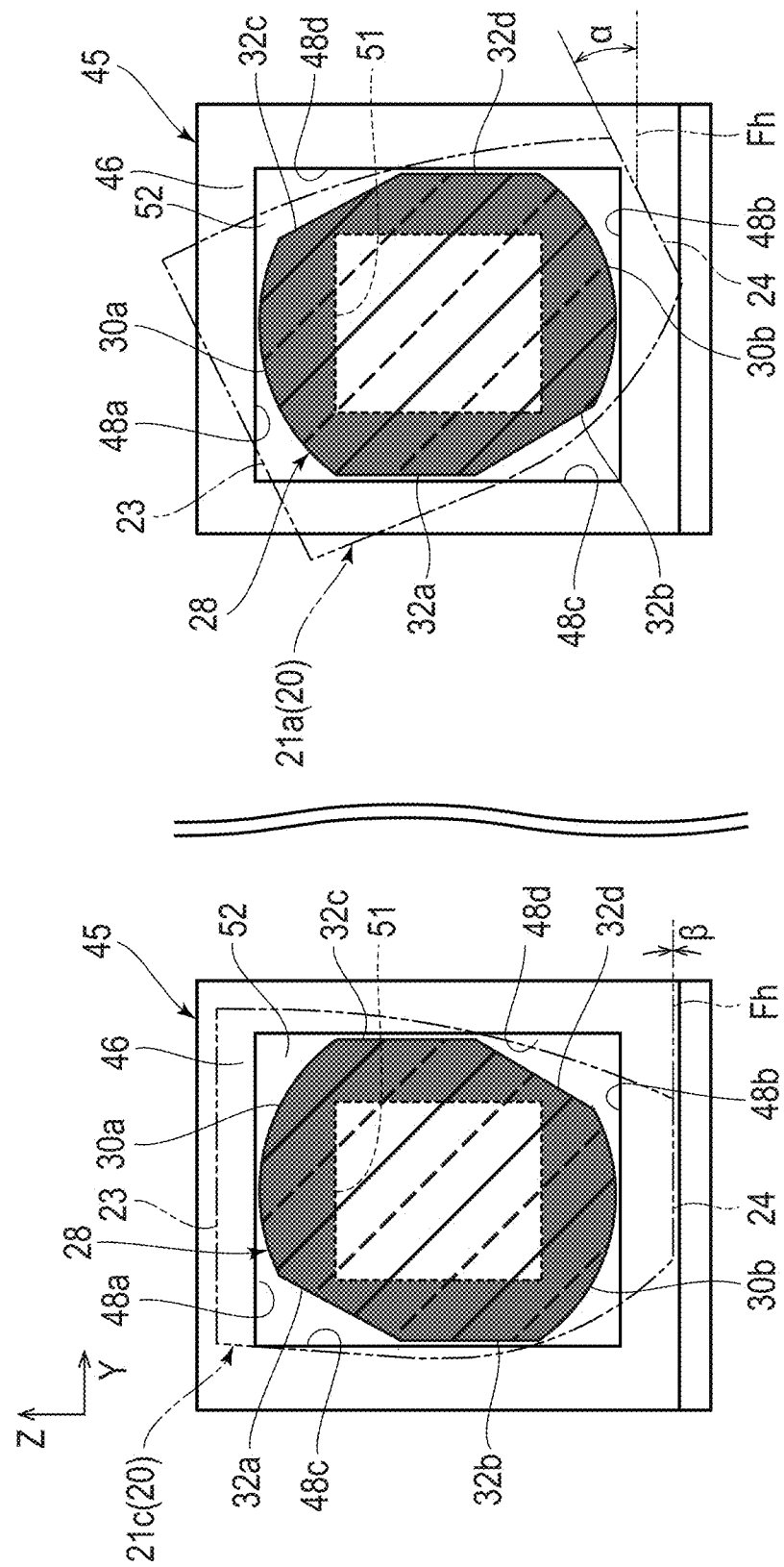
FIG. 9 is a sectional view showing a part of the lower image sensor unit.

FIG. 8 is a sectional view taken along line II-II shown in FIG. 7. FIG. 9 is a diagram where a part of a section taken along line III-III shown in FIG. 7 is extracted.

As shown in FIG. 8, a part of the end surface 29 of the axial part 28 of the first reflection light guide 21a and the first reflection light source 36a face each other. A part of the end surface 29 of the axial part 28 of the first reflection light guide 21a is in contact with the contact target surface 52 of the caps 45. On the other hand, the other end of the main body part 22 of the first reflection light guide 21a in the longitudinal direction is in contact with the side wall 15d of the frame 14. In this case, the cushion member 55 is in a state of being compressed between the circuit substrate 41 and the side wall 15c of the frame 14. Consequently, the cap 45 is urged toward the first reflection light guide 21a by the force of the cushion member 55 of returning to the original state. Accordingly, the contact target surface 52 of the cap 45 is always in contact with the part of the end surface 29 of the axial part 28. Here, the cap 45 is fixed onto the circuit substrate 41. Consequently, the interval between the first reflection light source 36*a* mounted on the circuit substrate 41 and the end surface 29 of the first reflection light guide 21*a* is always constant.

In a case where the first reflection light guide 21*a* is expanded or contracted owing to the environmental temperature, only the amount of compression of the cushion member 55 varies owing to the amount of expansion and contraction of the first reflection light guide 21*a*, and the contact target surface 52 of the cap 45 and the part of the end surface 29 of the axial part 28 are always in contact with each other. Consequently, even in the case where the first reflection light guide 21*a* is expanded or contracted, the interval between the first reflection light source 36*a* and the end surface 29 of the first reflection light guide 21*a* is always contact.

The first reflection light source 36*a* has thus been described. Likewise, the second reflection light source 36*b* and the transmission light source 36*c* have the same configuration.

Next, positioning of the first reflection light guide 21*a* and the transmission light guide 21*c* in the direction orthogonal to the longitudinal direction is described.

As shown in FIG. 9, on the first reflection light guide 21*a* side, the first curved surface 30*a* of the axial part **28* is in proximity to or in contact with the first inner surface 48*a* of the positioning part 46 of the cap 45, and the second curved surface 30*b* of the axial part 28 is in proximity to or in contact with the second inner surface 48*b*. Consequently, the first inner surface 48*a* and the second inner surface 48*b* define the vertical direction of the first reflection light guide 21*a*.

As for the positioning part 46 of the cap 45, the first side surface 32*a* of the axial part 28 is in proximity to or in contact with the third inner surface 48*c*, and the fourth side surface 32*d* of the axial part 28 is in proximity to or in contact with the fourth inner surface 48*d*. Consequently, the third inner surface 48*c* and the fourth inner surface 48*d* define the width direction of the first reflection light guide 21*a*. In this case, the first reflection light guide 21*a* is positioned in a state where the light emission surface 23 is inclined. That is, the main direction of the light emitted from the first reflection light guide 21*a* obliquely points to the surface of the bill S. As for the first reflection light guide 21*a* in this embodiment, the diffusion surface 24 is inclined from the plane (virtual plane Fh) orthogonal to the vertical direction by an angle α (substantially 30°).

As shown in FIG. 9, also as for the transmission light guide 21*c*, the first curved surface 30*a* of the axial part 28 is in proximity to or in contact with the first inner surface 48*a* of the positioning part 46 of the cap 45, and the second curved surface 30*b* of the axial part 28 is in proximity to or in contact with the second inner surface 48*b*. Consequently, the first inner surface 48*a* and the second inner surface 48*b* define the vertical direction of the transmission light guide 21*c*.

As for the positioning part 46 of the cap 45, the second side surface 32*b* of the axial part 28 is in proximity to or in contact with the third inner surface 48*c*, and the third side surface 32*c* of the axial part 28 is in proximity to or in contact with the fourth inner surface 48*d*. Consequently, the third inner surface 48*c* and the fourth inner surface 48*d* define the width direction of the transmission light guide 21*c*. In this case, the transmission light guide 21*c* is different from the first reflection light guide 21*a*. The light emission surface 23 is positioned in a substantially horizontal state. That is, the main direction of the light emitted from the transmission light guide 21*c* points so as to be orthogonal to the surface of the bill S. As for the transmission light guide 21*c* in this embodiment, the diffusion surface 24 is inclined from the plane (virtual plane Fh) orthogonal to the vertical direction by an angle β (substantially 0°).

As described above, the cap 45 can position the first reflection light guide 21*a* and the transmission light guide 21*c*, which have the same configuration, to have different orientations, that is, at different angles.

Here, the first reflection light guide 21*a* and the transmission light guide 21*c* have been described. Likewise, positioning of the second reflection light guide 21*b* in the direction orthogonal to the longitudinal direction is performed in a manner analogous to that of the first reflection light guide 21*a*.

In FIG. 9, a region of the axial part 28 where this region overlaps the contact target surface 52 of the cap 45 is represented as a region colored with gray, and a region of overlapping the light source side opening 51 of the cap 45 is represented as a region without color. In a case where the colored region and the non-colored region are considered as the end surface 29 of the axial part 28, the colored region corresponds to the contact surface that is in contact with the contact target surface 52, and the non-colored region corresponds to the incident surface on which light from the light source is incident. As shown in FIG. 9, the first reflection light guide 21*a* and the transmission light guide 21*c*, which are positioned to have the different orientations, have the different positions of the contact surface and the incident surface.

Next, the operation of the image reading part 11 configured as described above is described. The image reading part 11 causes the LED chips 37*r*, 37*g*, 37*b* and 37*ir* of the first reflection light source 36*a* and the second reflection light source 36*b* to emit light sequentially toward the bill S being conveyed by the conveyor rollers 101A, 101B, 102A and 102 B in the conveyance direction F at a predetermined conveyance speed. The light from the first reflection light source 36*a* and the light from the second reflection light source 36*b* enter the incident surface (corresponding to the non-colored region on the first reflection light guide 21*a* side shown in FIG. 9) of the axial part 28 through the light source side opening 51 of the cap 45, and travel toward the main body part 22. In this case, the cap 45 covers the axial part 28, thereby preventing the light from leaking to the outside of the axial part 28. The light in the main body part 22 is emitted, as light for reflection, from the light emission surfaces 23 of the first reflection light guide 21*a* and the second reflection light guide 21*b*, to point to a reading position O1 on the bill S as indicated by arrows E1 and E2 typified in FIG. 1. That is, the light for reflection is emitted linearly over the main-scan direction toward one surface (lower surface) of the bill S in two directions between which the light collector 60 intervenes.

The light for reflection is reflected by the bill S to be reflection light and is focused on the image sensor 65 through the light collector 60. The focused reflected light is converted into an electric signal by the image sensor 65, and the electric signal is processed by a signal processing portion, not shown.

As described above, the operation of reading the bill S along one scan line in the main-scan direction is completed by reading the entire RGB and IR reflected lights for one scan line. After the reading operation for one scan line is completed, the bill S is moved in the sub-scan direction, and the same reading operation as described above is performed for the next one scan line. The reading operation for one scan line is repeated while conveying the bill S in the conveyance direction F, thereby sequentially scanning the whole surface of the bill S to achieve reading of the image information with the reflected light.

The image reading part 11 of the upper image sensor unit 10B performs the analogous operation on the other surface (upper surface).

Next, the operation of the transmission illumination part 12 configured as described above is described. The transmission illumination part 12 causes the LED chips 37r, 37g, 37b and 37ir of the transmission light source 36c to emit light sequentially toward the bill S being conveyed by the conveyor rollers 101A, 101B, 102A and 102 B in the conveyance direction F at the predetermined conveyance speed. The light from the transmission light source 36c enters the incident surface of the end surface 29 (corresponding to the non-colored region on the transmission light guide 21c side shown in FIG. 9) of the axial part 28 through the light source side opening 51 of the cap 45, and travels toward the main body part 22. The light is emitted as light for transmission pointing to a reading position O2 on the bill S as indicated by an arrow E3 typified in FIG. 1, from the light emission surface 23 of the transmission light guide 21c. That is, the light for transmission is emitted linearly over the main-scan direction toward one surface (lower surface) of the bill S.

The light for transmission transmits through the bill S, as transmission light, and is focused on the image sensor 65 through the light collector 60 of the upper image sensor unit 10B. The focused transmission light is converted into an electric signal by the image sensor 65 of the upper image sensor unit 10B, and the electric signal is processed by a signal processing portion, not shown.

As described above, the operation of reading the bill S along one scan line in the main-scan direction is completed by reading the entire RGB and IR transmission lights for one scan line. After the reading operation for one scan line is completed, the bill S is moved in the sub-scan direction, and the same reading operation as described above is performed for the next one scan line. The reading operation for one scan line is repeated while conveying the bill S in the conveyance direction F, thereby sequentially scanning the whole surface of the bill S to achieve reading of the image information with the transmission light.

The transmission illumination part 12 of the upper image sensor unit 10B performs the same operation on the other surface (upper surface).

As described above, the first reflection light guide 21a of this embodiment includes the main body part 22, and the axial part 28, which is configured as the end part. The axial part 28 is narrower than the main body part 22, and includes the end surface 29 serving as the contact surface that is in contact with the cap 45. The axial part 28 is in contact with the cap 45, thereby allowing the longitudinal direction (X-axis direction) of the first reflection light guide 21a to be defined and allowing the interval between the first reflection light guide 21a and the first reflection light source 36a to be constant. The cap 45 includes the light source side opening 51. At the light source side opening 51, the first reflection light source 36a is disposed. The first reflection light source 36a faces the contact surface. Consequently, even with the axial part 28 being in contact with the cap 45, the cap 45 includes the light source side opening 51, thereby allowing light from the first reflection light source 36a to enter the first reflection light guide 21a through the light source side opening 51.

As for the axial part 28 of the first reflection light guide 21a in this embodiment, the surface that is in the axial direction and is in the direction intersecting with the end surface 29 is in contact with the cap 45. Consequently, the first reflection light guide 21a is positioned not only in the longitudinal direction but also in the direction intersecting with the end surface 29.

The first reflection light guide 21a in this embodiment is narrower than the main body part 22. Consequently, in the case where the surface of the axial part 28 that is in the axial direction and in the direction intersecting with the end surface 29 is in contact with the cap 45, the cap 45 that surrounds the axial part 28 can be configured to be small. That is, in comparison with the case where the axial part 28 is configured not to be narrower than the main body part 22, the cap 45 can be configured to be small. Accordingly, the illumination device that includes the cap 45, and the image sensor unit 10A can be small in size.

As for the axial part 28 of the first reflection light guide 21a in this embodiment, the surface that is in the axial direction and is in the direction intersecting with the end surface 29 has two combinations of parallel sides in view of the axial part 28 in the axial direction. More specifically, the axial part 28 has the two pairs, which are the combination of the side of the first side surface 32a and the side of the fourth side surface 32d, and the combination of the side of the second side surface 32b and the side of the third side surface 32c. In this case, a third inner surface 49c and a fourth inner surface 49d of the cap 45 hold any one combination among the combinations of sides, thereby allowing the first reflection light guide 21a to be positioned to have a different orientation. That is, the cap 45 can position the first reflection light guide 21a so that the direction of the light emitted from the light emission surface 23 can be different.

The number of combinations of side surfaces that are parallel to each other is not limited to two. The number may be two or more. In this embodiment, the case has been described where the axial part 28 of the first reflection light guide 21a has the shape including the combinations of the parallel sides and curves in view of the axial direction. However, the present invention is not limited to this case. The shape may be a polygon, such as a triangle, a quadrangle or a pentagon, or a round shape, such as a circle or an oval.

The first reflection light guide 21a in this embodiment is positioned by the cap 45 that has the contact target surface 52 with which the contact surface is in contact. As described above, the stable contact is achieved by causing the surfaces to be in contact with each other. Accordingly, the interval between the first reflection light guide 21a and the first reflection light source 36a can be prevented from being changed. The present invention is not limited to the case where the contact surface of the axial part 28 is in contact with the contact target surface 52 of the cap 45. Alternatively, the surface may be in contact with another member nearer to the first reflection light source 36a.

The axial part 28 of the first reflection light guide 21a in this embodiment has the two combinations as pairs of parallel side surfaces on the outer peripheral surfaces; the combinations are the combination of the first side surface 32a and the fourth side surface 32d, and the combination of the second side surface 32b and the third side surface 32c. In this case, the third inner surface 49c and the fourth inner surface 49d of the cap 45 hold any one combination among the combinations of side surfaces, thereby allowing the first reflection light guide 21a to be positioned to have a different orientation. That is, the cap 45 can position the first reflection light guide 21a so that the direction of the light emitted from the light emission surface 23 can be different.

The distance W1 between the first side surface 32a and the fourth side surface 32d, and the distance W2 between the second side surface 32b and the third side surface 32c are substantially identical to each other. An inner surface 49a and an inner surface 49b of the cap 45 can hold any of the combinations of side surfaces without backlash.

The number of combinations of side surfaces that are parallel to each other is not limited to two. The number may be two or more. In this case, it is preferable that for all the combinations of side surfaces, the distances between the side surfaces be substantially identical to each other.

The axial part 28 of the first reflection light guide 21a in this embodiment has the first curved surface 30a and the second curved surface 30b that are opposite each other, on surfaces other than the first side surface 32a, the second side surface 32b, the third side surface 32c and the fourth side surface 32d, of the outer peripheral surface. Consequently, in the cases where the third inner surface 49c and the fourth inner surface 49b hold any of the combinations of side surfaces, the first inner surface 49a and the second inner surface 49b of the cap 45 can hold the first curved surface 30a and the second curved surface 30b.

In view of the axial part 28 in the axial direction, the first curved surface 30a and the second curved surface 30b are arcs included in a part of a common virtual circle C. Consequently, even in the cases where the third inner surface 49c and the fourth inner surface 49d hold any of the combinations of side surfaces, the inner surface 49a and the inner surface 49b of the cap 45 can hold the first curved surface 30a and the second curved surface 30b without backlash.

The advantageous effects pertaining to the first reflection light guide 21a have thus been described. Likewise, these effects are applicable to the second reflection light guide 21b and the transmission light guide 21c.

(Second Embodiment)

Next, a different embodiment of an image sensor unit is described. As for the image sensor unit 70 in this embodiment, first reflection light sources 36a are disposed on the opposite sides of a first reflection light guide 71a in the longitudinal direction. Configuration elements analogous to those in the first embodiment are assigned the same symbols or the like. The description is appropriately omitted.

Figure 10:
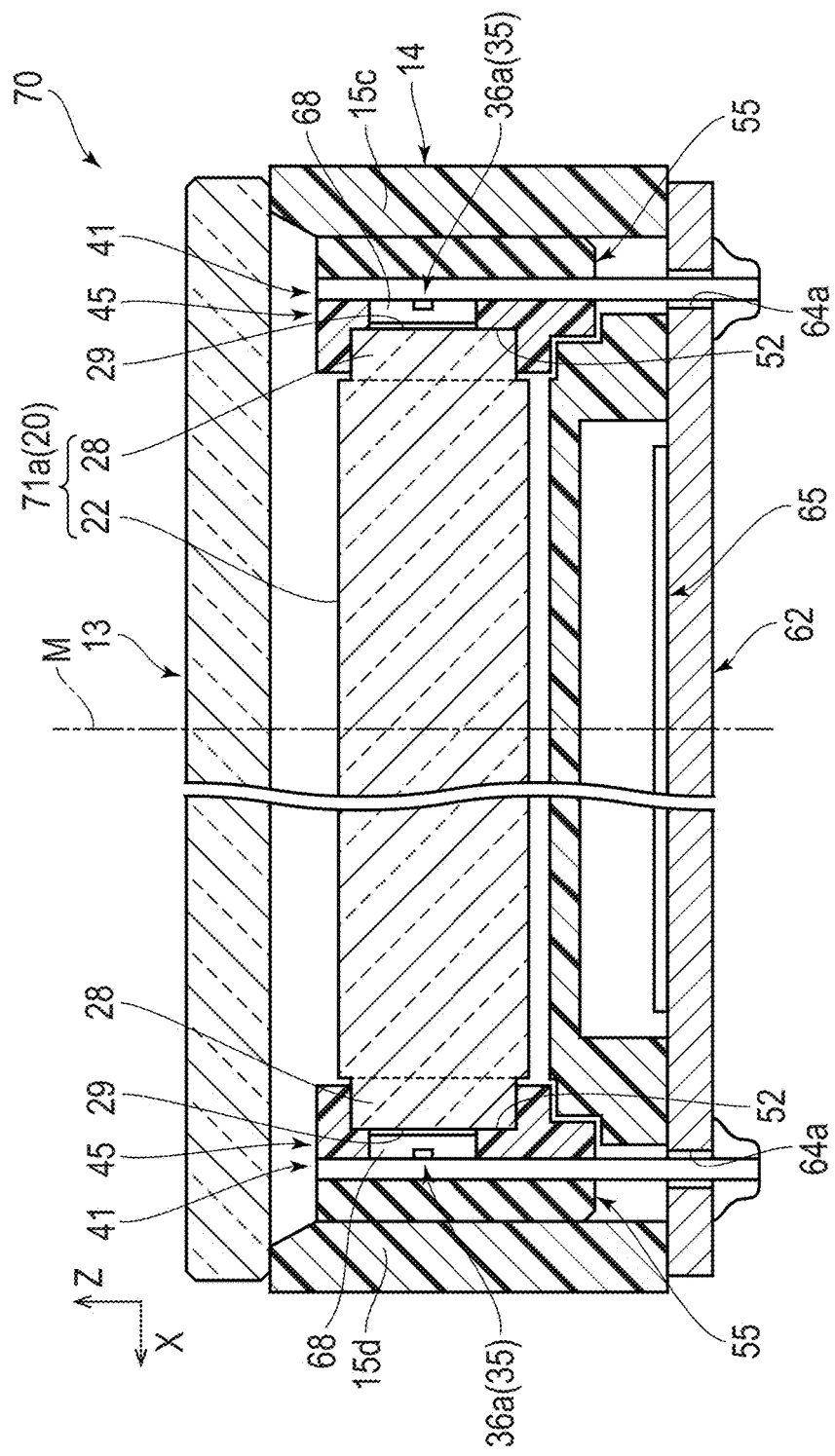
FIG. 10 is a sectional view of an image sensor unit of a second embodiment.

FIG. 10 is a sectional view taken so as to include the first reflection light guide 71a of the image sensor unit 70. The first reflection light guide 71a includes two axial parts 28. That is, the axial parts 28 are provided at one end and the other end of the main body part 22 in the longitudinal direction. The configurations of the two axial parts 28 are analogous to the configuration of the axial part 28 in the first embodiment. The image sensor unit 70 includes caps 45, first reflection light sources 36a, circuit substrates 41a, cushion members 55, and pieces of coating resin 68, the numbers of which are each two, are provided in conformity with the two axial parts 28. Here, the configuration members of the image sensor unit 70 are symmetrical with respect to a line M indicated as a chain line in FIG. 10.

In the image sensor unit 70 in this embodiment, light is emitted and incident from the two first reflection light sources 36a disposed on the opposite sides of the first reflection light guide 71a in the longitudinal direction. Consequently, the illuminance of light emitted from the first reflection light guide 71a can be improved. The first reflection light guide 71a is positioned by the caps 45 at the opposite ends of the first reflection light guide 71a. Consequently, the positioning accuracy can be improved.

In this embodiment, only the first reflection light guide 71a has been described. Likewise, the second reflection light guide and the transmission light guide can be configured as with the configuration of the first reflection light guide 71a.

(Third Embodiment)

Next, a configuration where the above-described image sensor unit 10A is applied to a flatbed-type scanner as an image reading apparatus is described with reference to FIG. 11.

Figure 11:
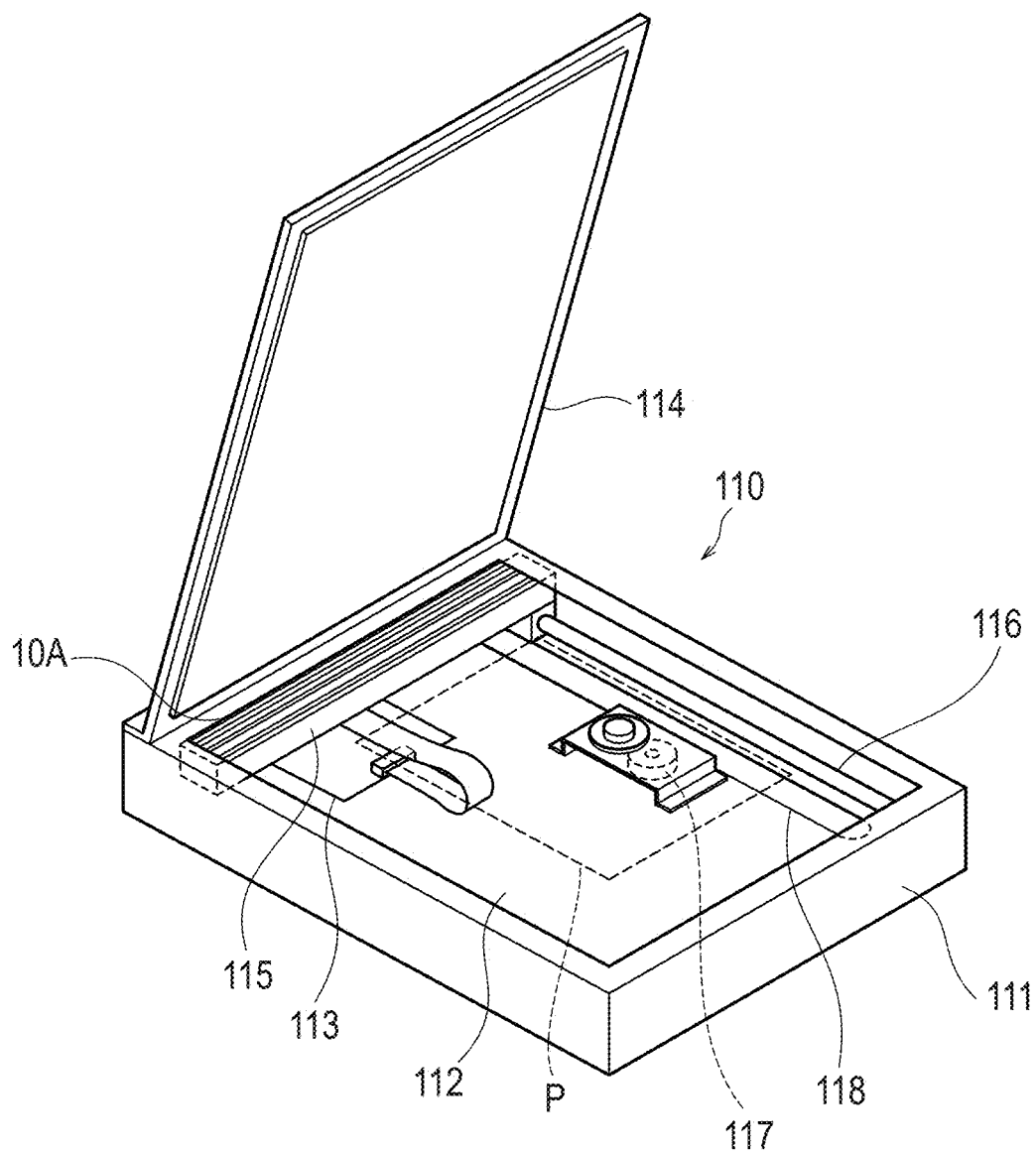
FIG. 11 is a perspective view showing the configuration of a flatbed-type scanner.

FIG. 11 is a perspective view showing an example of the configuration of the flatbed-type scanner.

A scanner 110 includes: a housing 111; a platen glass 112 as a part on which an object to be illuminated is mounted; the image sensor unit 10A, a drive mechanism as a drive part that drives the image sensor unit 10A; a circuit substrate 113; and a platen cover 114. The platen glass 112 is made up of a transparent plate, such as glass, and is attached onto the upper surface of the housing 111. The platen cover 114 is attached to the housing 111 so as to be openable and closable through a hinge mechanism and to cover an object P to be illuminated mounted on the platen glass 112. The image sensor unit 10A, the drive mechanism for driving the image sensor unit 10A, and the circuit substrate 113 are housed in the housing 111. The scanner 110 includes the platen glass 112. Consequently, the image sensor unit 10A does not necessarily include the cover member 13.

The drive mechanism includes a holding member 115, a guide shaft 116, a drive motor 117, and a wire 118. The holding member 115 holds the image sensor unit 10A so as to surround this unit. The guide shaft 116 guides the holding member 115 so that this member can move in the reading direction (sub-scan direction) along the platen glass 112. The drive motor 117 and the holding member 115 are coupled to each other via the wire 118, and moves the holding member 115, which holds the image sensor unit 10A, in the sub-scan direction by the drive force of the drive motor 117. The image sensor unit 10A then reads an original that is the object P to be illuminated mounted on the platen glass 112 while being moved in the sub-scan direction by the drive force of the drive motor 117. As described above, the object P to be illuminated is read while at least one of the image sensor unit 10A and the object P to be illuminated is moved.

An image processing circuit that applies a predetermined image processing to an image read by the image sensor unit 10A, a control circuit that controls each part of the scanner 110 that includes the image sensor unit 10A, and a power source circuit that supplies electric power to each part of the scanner 110 are constructed on the circuit substrate 113.

(Fourth Embodiment)

Next, a configuration where the above-described image sensor unit 10A is applied to a sheetfeed-type scanner as an image reading apparatus is described with reference to FIG. 12.

Figure 12:
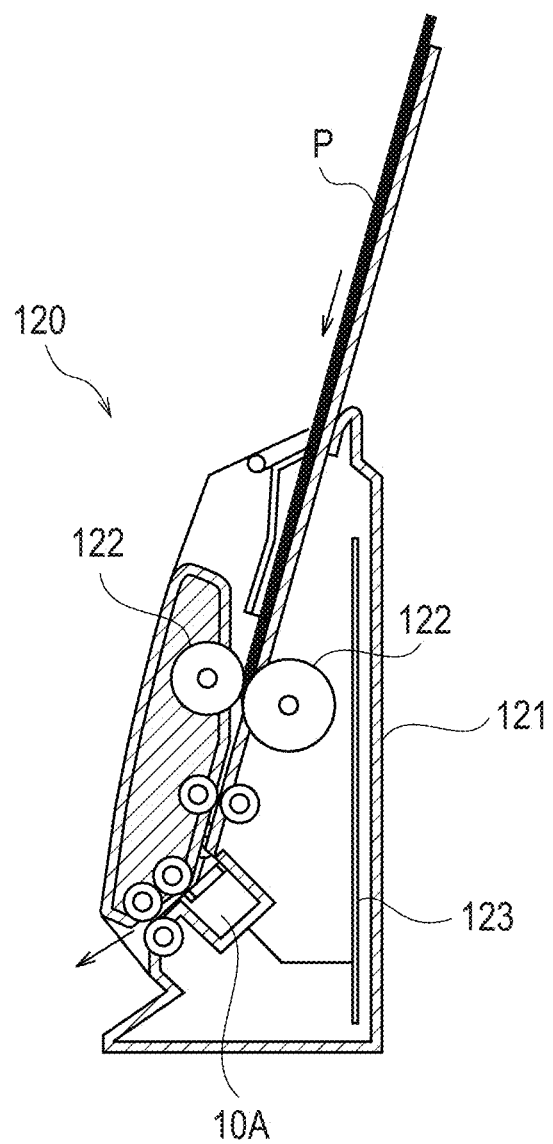
FIG. 12 is a sectional view showing the configuration of a sheetfeed-type scanner.

FIG. 12 is a sectional view showing an example of the configuration of the sheetfeed-type scanner.

A scanner 120 includes a housing 121, the image sensor unit 10A, conveyor rollers 122, and a circuit substrate 123. The conveyor rollers 122 are rotated by a drive mechanism, which is not shown, and conveys the object P to be illuminated while intervening this object. A control circuit that controls each part of the scanner 120 that includes the image sensor unit 10A, and a power source circuit that supplies electric power to each part of the scanner 120 are constructed on the circuit substrate 123.

The scanner 120 then causes the image sensor unit 10A to read the object P to be illuminated while causing the conveyor rollers 122 to convey the object P to be illuminated in the reading direction (sub-scan direction). That is, the object P to be illuminated is read while at least one of the image sensor unit 10A and the object P to be illuminated is moved.

(Fifth Embodiment)

Next, a configuration where the above-described image sensor unit 10A is applied to an image forming apparatus (forming apparatus) is described with reference to FIGS. 13 and 14.

Figure 13:
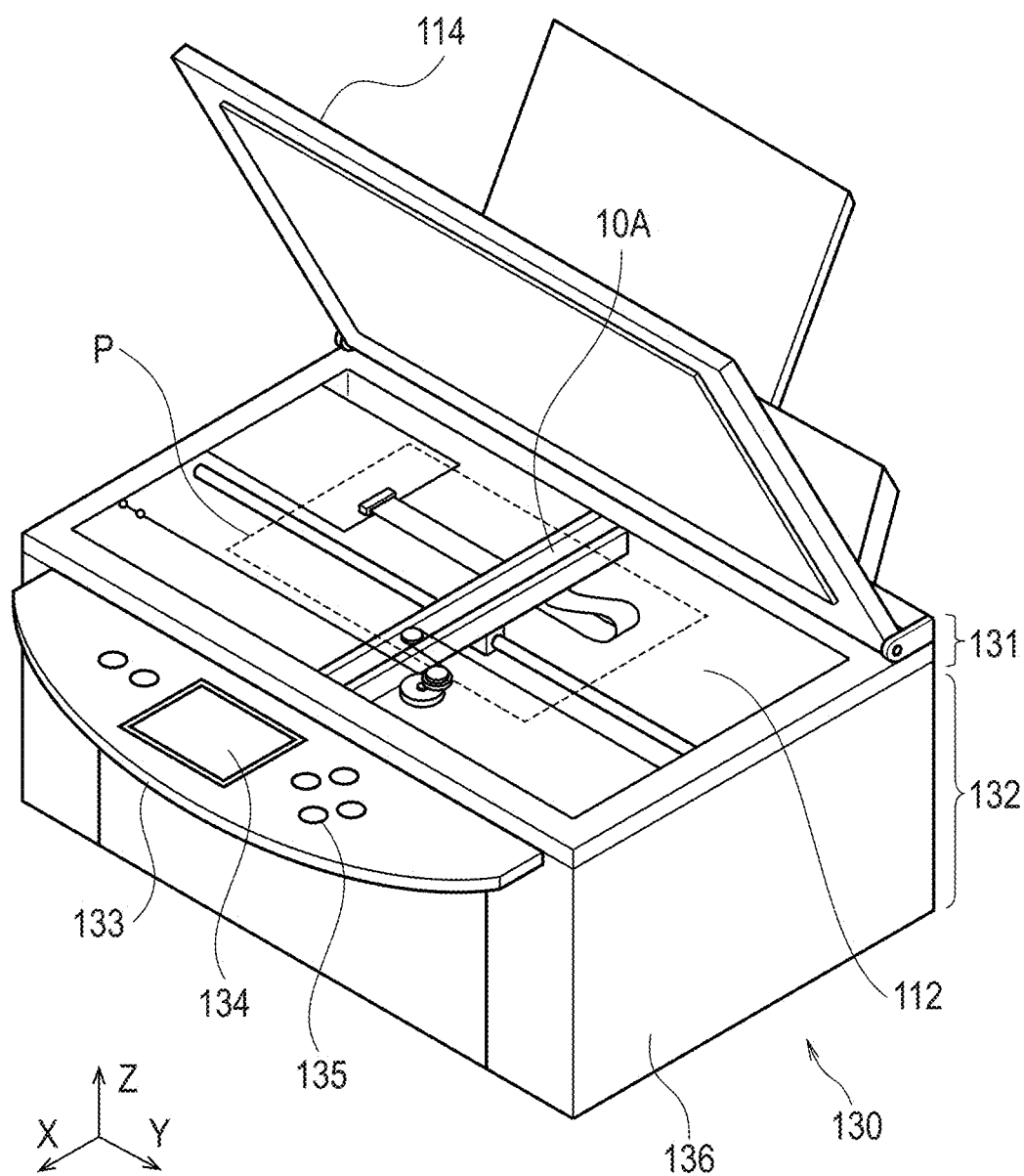
FIG. 13 is a perspective view showing the appearance of an image forming apparatus.
Figure 14:
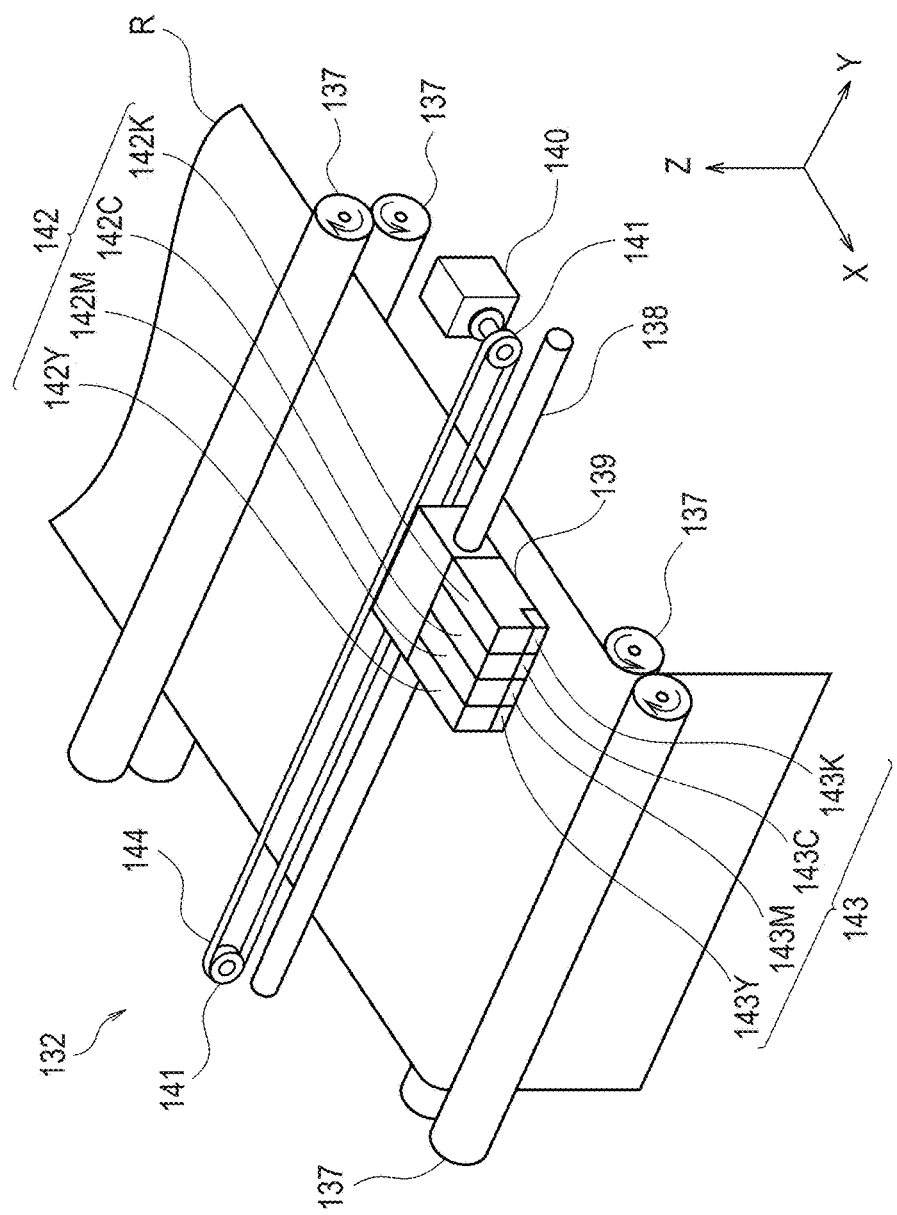
FIG. 14 is a perspective view showing an image forming part in the image forming apparatus.

FIG. 13 is a perspective view showing the appearance of the image forming apparatus. FIG. 14 is a perspective view showing an image forming part provided in a housing of the image forming apparatus in a manner with this part being extracted.

An image forming apparatus 130 is a multifunction printer (MFP) in which a flatbed-type scanner and an inkjet-type printer are combined. The image forming apparatus 130 includes an image reading part 131 as image reading means for reading an image, and an image forming part 132 as image forming means for forming an image. The image sensor unit 10A is installed in the image reading part 131 of the image forming apparatus 130. The configuration common to that of the above-described scanner 110 can be applied to the image reading part 131 of the image forming apparatus 130. Consequently, description of configuration elements common to those of the scanner 110 is omitted.

As shown in FIG. 13, the image forming apparatus 130 includes an operation part 133. The operation part 133 includes a display part 134 that displays an operation menu and various messages, and various operation buttons 135 for operation for the image forming apparatus 130. As shown in FIG. 14, the image forming part 132 is provided in a housing 136 of the image forming apparatus 130. The image forming part 132 includes conveyor rollers 137, a guide shaft 138, an inkjet cartridge 139, a motor 140, and a pair of timing pulleys 141. The conveyor rollers 137 are rotated by the drive force of a drive source to convey a printer sheet R as a recording medium in the sub-scan direction. The guide shaft 138 is a member having a rod shape, and is fixed to the housing 136 of the image forming apparatus 130 so that its axis can be parallel to the main-scan direction of the printer sheet R.

The inkjet cartridge 139 can move to and fro in the main-scan direction of the printer sheet R by sliding along the guide shaft 138. The inkjet cartridge 139 includes, for example, ink tanks 142 (142C, 142M, 142Y and 142K) that contain cyan C, magenta M, yellow Y, and black K inks, and discharge heads 143 (143C, 143M, 143Y and 143K) provided for the respective ink tanks 142. One of the pair of the timing pulleys 141 is attached to a rotation shaft of the motor 140. The pair of timing pulleys 141 are provided at positions apart from each other in the main-scan direction of the printer sheet R. A timing belt 144 is wound around the pair of timing pulleys 141 in a manner of being wound parallel, and a predetermined point of this belt is coupled to the inkjet cartridge 139.

The image reading part 131 of the image forming apparatus 130 converts an image read by the image sensor unit 10A into an electric signal in a format suitable to printing. The image forming part 132 of the image forming apparatus 130 drives the conveyor rollers 137, the motor 140 and the inkjet cartridge 139, and forms an image on the printer sheet R on the basis of the electric signal converted by the image sensor unit 10A of the image reading part 131. The image forming part 132 of the image forming apparatus 130 can form an image also on the basis of an electric signal input from the outside. The image forming part 132 in the image forming apparatus 130 may have the same configuration and operation as various conventionally known printers. Accordingly, the detailed description is omitted. The inkjet-type image forming apparatus has been described as the image forming part 132. Alternatively, any of the electronic photograph, thermal transfer, and dot impact types may be adopted.

Although preferred embodiments of the present invention have been described above, the present invention is not limited to these embodiments, and various modifications and alterations can be made without departing from the spirit of the present invention. The embodiments may be combined.

In the above-described first embodiment, the case has been described where the lower image sensor unit 10A and the upper image sensor unit 10B include the image reading part 11 and the transmission illumination part 12. Any of the image reading part 11 and the transmission illumination part 12 may be omitted.

In the above-described first embodiment, the case has been described where the reflection light illumination part 11A includes the first reflection light guide 21a and the second reflection light guide 21b. Any of the first reflection light guide 21a and the second reflection light guide 21b may be omitted. In this case, any of the first reflection light source 36a and the second reflection light source 36b, which is to emit light to the omitted light guide, may be omitted.

In the above-described first embodiment, the illumination device and the image sensor unit may be configured by omitting the second reflection light guide 21b and including the two light guides that are the first reflection light guide 21a and the transmission light guide 21c. In the above-described first embodiment, the illumination device and the image sensor unit may be configured by omitting the first reflection light guide 21a and including the two light guides that are the second reflection light guide 21b and the transmission light guide 21c. In this case, the two light guides are held by the caps 45 so as to have different angles. In the case where the illumination device and the image sensor unit are configured by including the two light guides so as to have the different angles, one of the two may be any one of the first reflection light guide 21a, the second reflection light guide 21b and the transmission light guide 21c, and the remaining one may be another light guide that does not include the axial part 28.

Here, the angles of the light guides in the case where the other light guide is included is the angle of the diffusion surface of the light guide. That is, the light guides are held so that the angle of the diffusion surface 24 of any one of the first reflection light guide 21a, the second reflection light guide 21b, and the transmission light guide 21c can be different from the angles of the diffusion surface of the other light guide. The other light guide is held by a holding part provided for the frame 14 or the like.

In the above-described first embodiment, the case has been described where the cushion member 55 is fixed to the circuit substrate 41. However, the present invention is not limited to this case. The cushion member 55 may not be fixed, or may be fixed to the side wall 15c of the frame 14. As indicated by the chain double-dashed line in FIG. 8, the cushion member 55 may be disposed on the other end surface of the first reflection light guide 21a.

The present invention defines the X-axis direction. Consequently, even in the case where the contact surface residing in the direction intersecting with the longitudinal direction is in contact with the positioning member, the positioning member includes the opening to thereby allow light to enter the light guide through this opening.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

What is claimed is:

1. A light guide that comprises an end part and a main body part, has a linear rod-like shape including the end part and the main body part, and allows light from a light source to enter the end part and to be emitted from the main body part,
    wherein the end part is narrower than the main body part,
    the end part has an end surface,
    a part of the end surface is a contact surface that is in contact with a positioning member,
    another part of the end surface is an incident surface which faces the light source, and
    the positioning member has an opening in which the light source is disposed.

2. The light guide according to claim 1, wherein a surface of the end part that is in an axial direction and is in a direction intersecting with the contact surface is in contact with the positioning member.

3. The light guide according to claim 1, wherein the positioning member does not allow light from the light source to be transmitted through the positioning member.

4. The light guide according to claim 1, wherein a surface of the end part that is in an axial direction and is in a direction intersecting with the contact surface has two or more pairs of parallel sides in view of the end part in the axial direction.

5. The light guide according to claim 1, wherein a surface of the end part that is in an axial direction and is in a direction intersecting with the contact surface has a round shape in view of the end part in the axial direction.

6. The light guide according to claim 1, wherein the light guide is positioned by a contact target surface of the positioning member with which the contact surface is in contact.

7. The light guide according to claim 1, wherein the end part includes a plurality of combinations that are on an outer peripheral surface and are each a pair of side surfaces that are parallel to each other.

8. The light guide according to claim 7, wherein the plurality of combinations each have a substantially identical distance between the pair of side surfaces that are parallel to each other.

9. The light guide according to claim 7, wherein the end part includes a pair of curved surfaces that are opposite each other, on surfaces other than the pair of side surfaces that are parallel to each other, of the outer peripheral surface.

10. The light guide according to claim 9, wherein in view of the end part in an axial direction, the pair of curved surfaces is arcs included in a part of a common virtual circle.

11. The light guide according to claim 1, wherein
    the main body part is not in contact with the positioning member.

12. The light guide according to claim 1, wherein the positioning member includes a contact target surface that positions the light guide in a linear direction of the linear rod-like shape.

13. The light guide according to claim 1, wherein the end part has a side surface, and the light guide is positioned in a direction intersecting a linear direction of the linear rod-like shape by the side surface in contact with an inner surface of the positioning member.

14. An illumination device, comprising:
    a light source;
    a light guide that emits light from the light source; and
    a frame that houses the light source and the light guide,
    wherein the light guide is the light guide according to claim 1.

15. The illumination device according to claim 14, wherein the contact surface includes an urging member that urges the contact surface so as to be in contact with the positioning member.

16. A sensor unit, comprising:
    the illumination device according to claim 14;
    a rod lens array that focuses light having been emitted from the illumination device and reflected by an object to be illuminated; and
    a line sensor that converts the light focused by the rod lens array into an electric signal.

17. A sensor unit, comprising:
    the illumination device according to claim 14;
    a light collector that focuses light having been emitted from the illumination device and reflected by an object to be illuminated; and
    a sensor that converts the light focused by the light collector into an electric signal.

18. A reading apparatus, comprising:
    the sensor unit according to claim 16; and
    a drive part that moves at least one of the sensor unit and the object to be illuminated.

19. An image forming apparatus, comprising:
    the sensor unit according to claim 16;
    a drive part that moves at least one of the sensor unit and the object to be illuminated; and
    an image forming part that forms an image read by the sensor unit, on a recording medium.

20. A paper sheet distinguishing apparatus, comprising:
    the sensor unit according to claim 16; and
    a comparing part that compares an image of a bill read by the sensor unit with a preliminarily stored image of a bill, and authenticates the bill whose image has been read by the sensor unit.

21. An illumination device, comprising:
    a plurality of light sources;
    two light guides that each emit light from the plurality of light sources to an object to be illuminated; and
    a frame that houses the plurality of light sources and the two light guides,
    wherein at least one light guide between the two light guides is the light guide according to claim 1, and
    the two light guides have inclination angles that are different from each other.

* * * * *